(12) United States Patent
Yamaguchi et al.

(10) Patent No.: US 6,493,361 B1
(45) Date of Patent: *Dec. 10, 2002

(54) DATA TRANSMISSION AND RECEIVING SYSTEM FOR MULTIPLEXING DATA WITH VIDEO DATA

(75) Inventors: Akira Yamaguchi, Kanagawa (JP); Taku Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/160,419

(22) Filed: Sep. 25, 1998

Related U.S. Application Data

(63) Continuation of application No. 08/718,322, filed on Dec. 12, 1996, now Pat. No. 5,910,822.

(30) Foreign Application Priority Data

Jan. 30, 1995 (JP) .............................. 7-013064

(51) Int. Cl.[7] ................................. H04N 7/08
(52) U.S. Cl. ...................... 370/532; 370/546; 348/476; 348/479
(58) Field of Search ................. 348/476, 473, 348/479, 465, 467, 478, 498, 469, 222; 370/535, 536, 537, 538, 539, 540, 541, 542, 545, 546, 532, 533, 534

(56) References Cited

U.S. PATENT DOCUMENTS

| | | | | |
|---|---|---|---|---|
| 3,900,887 A | * | 8/1975 | Soga et al. ................... 360/18 |
| 4,191,969 A | * | 3/1980 | Briand et al. ................ 358/145 |
| 4,350,999 A | * | 9/1982 | Mortimer ..................... 358/147 |
| 4,636,858 A | * | 1/1987 | Hague et al. ................ 348/463 |
| 4,644,399 A | * | 2/1987 | McCord et al. ............. 358/142 |
| 4,646,149 A | * | 2/1987 | Wojnarowski et al. ....... 358/143 |
| 4,652,903 A | * | 3/1987 | Lucas .......................... 358/11 |
| 4,750,036 A | * | 6/1988 | Martinez ..................... 358/147 |
| 5,818,846 A | * | 10/1998 | Mori et al. .................. 370/532 |

* cited by examiner

*Primary Examiner*—Ricky Ngo
(74) *Attorney, Agent, or Firm*—Frommer Lawrence & Haug, LLP.; William S. Frommer

(57) ABSTRACT

A data transmission apparatus and a camera system for multiplexing serial data into horizontal blanking portions of video data for transmission between a CHU (1) and a CCU (2). On the transmitting side, resampled data is obtained by sampling the serial data using a clock signal of a frequency higher than that of the transmission rate of the serial data. A predetermined number of resampled data items are selected as multiplexing data from the resampled data obtained in each of the horizontal periods of the video data. The multiplexing data is multiplexed into the horizontal blanking portions of the video data for transmission. On the transmitting side, the multiplexing data is separated from the received video data. The separated multiplexing data is decoded so as to extract successively definite data constituting the initial serial data.

20 Claims, 12 Drawing Sheets

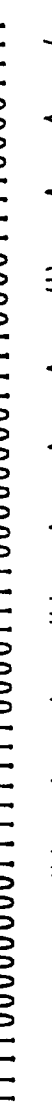
FIG. 8A CLK2
FIG. 8B CLK1
FIG. 8C CMDa
FIG. 8D BIPHASE DATA
FIG. 8E RESAMPLED DATA

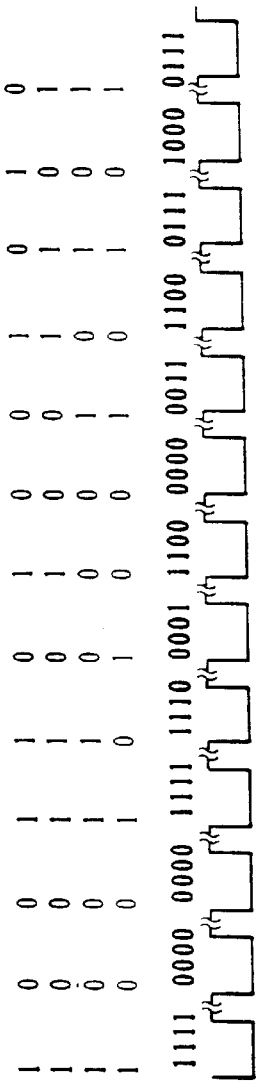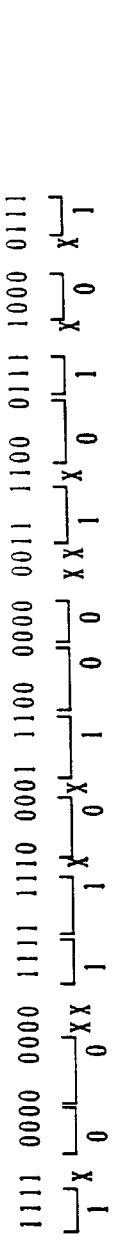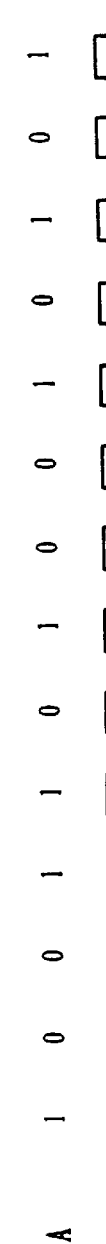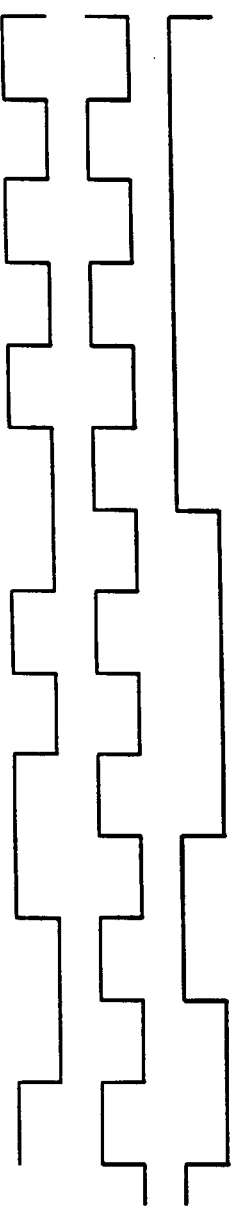
FIG. 12A MMDa
FIG. 12B SERIAL DATA AND ENB
FIG. 12C
FIG. 12D
FIG. 12E DEFINITE DATA
FIG. 12F CLK 4
FIG. 12G BIPHASE DATA
FIG. 12H CLK 5
FIG. 12i CMDa

FIG. 13A MMDa

FIG. 13B SERIAL DATA AND ENB

FIG. 13C

FIG. 13D DEFINITE DATA

FIG. 13E CLK4

FIG. 13F BIPHASE DATA

FIG. 13G CLK5

FIG. 13H CMDa

DATA TRANSMISSION AND RECEIVING SYSTEM FOR MULTIPLEXING DATA WITH VIDEO DATA

Continuation Application Continuation of prior application Ser. No. 08/718,322, filed Dec. 12, 1996 now U.S. Pat. No. 5,910,822.

TECHNICAL FIELD

The present invention relates to an apparatus and a method for multiplexing serial data into horizontal blanking portions of video data to be transmitted, involving little data delay and doing away with complicated control procedures. More particularly, the invention relates to a video camera system incorporating the same apparatus and method.

BACKGROUND ART

When any communication command furnished in serial data is to be multiplexed into horizontal blanking portions of video data (e.g., 8-bit parallel data), the serial communication command is first converted conventionally to parallel data reaching the CPU (central processing unit) or the like. It is in the form of parallel data that the communication command is multiplexed into the horizontal blanking period of video data.

If the transmission rate of serial communication command data is lower than the horizontal blanking rate (about 15 kHz), the conventional method above necessarily entails a delay equivalent to the serial-parallel conversion time for multiplexing.

For example, consider 11-bit serial communication command data composed of a start bit (1 bit), data (8 bits), a parity bit (1 bit) and a stop bit (1 bit). In such a case, to perform the conventional serial-parallel conversion requires waiting for the entire 11-bit data to be received. If the rate of serial communication command data is 9,600 bps, the delay amounts to approximately 17 horizontal periods. Where the data is to be multiplexed into horizontal blanking portions in each of the 17 horizontal periods, complicated control procedures are needed illustratively to determine which blanking portion is to have the data multiplexed therein and which portion is not to.

It is therefore an object of the present invention to provide an apparatus and a method for multiplexing serial data involving little data delay and without complicated control procedures for multiplexing.

DISCLOSURE OF THE INVENTION

In carrying out the invention and according to a first aspect thereof, there is provided a data transmission apparatus comprising: first data inputting means for inputting serial data transmitted at a first rate; second data inputting means for inputting video data; data sampling means for generating resampled data by sampling the serial data input via the first data inputting means, the sampling being performed by use of a clock signal at a second rate higher than the first rate; data extracting means for extracting a predetermined number of resampled data from the resampled data output by the data sampling means in each of the horizontal periods of the video data; data multiplexing means for generating multiplexed data by multiplexing into horizontal blanking portions of the video data the predetermined number of resampled data extracted by the data extracting means; and data outputting means for outputting the multiplexed data generated by the data multiplexing means.

According to a second aspect of the invention, there is provided a data reception apparatus comprising: data inputting means for inputting multiplexed data acquired by multiplexing control data into horizontal blanking portions of video data; data separating means for separating the video data and the control data from the multiplexed data; data defining means for defining definite data from the control data separated by the data separating means; first data outputting means for outputting the definite data defined by the data defining means; and second data outputting means for outputting the video data separated by the data separating means.

According to a third aspect of the invention, there is provided a data transmission apparatus comprising: first data inputting means for inputting serial data transmitted at a first rate; second data inputting means for inputting video data; data sampling means for generating resampled data by sampling the serial data input via the first data inputting means, the sampling being performed by use of a clock signal at a second rate higher than the first rate; data extracting means for extracting a predetermined number of resampled data from the resampled data output by the data sampling means in each of the horizontal periods of the video data; data multiplexing means for generating multiplexed data by multiplexing into horizontal blanking portions of the video data the predetermined number of resampled data extracted by the data extracting means as control data; data transmitting means for transmitting the multiplexed data; data separating means for separating the video data and the control data from the multiplexed data transmitted by the data transmitting means; data defining means for defining definite data from the control data separated by the data separating means; first data outputting means for outputting the definite data defined by the data defining means; and second data outputting means for outputting the video data separated by the data separating means.

According to a fourth aspect of the invention, there is provided a video camera comprising: signal processing means for outputting video data; data inputting means for inputting serial data transmitted at a first rate; data sampling means for generating resampled data by sampling the serial data input via the data inputting means, the sampling being performed by use of a clock signal at a second rate higher than the first rate; data extracting means for extracting a predetermined number of resampled data from the resampled data output by the data sampling means in each of the horizontal periods of the video data; data multiplexing means for generating multiplexed data by multiplexing into horizontal blanking portions of the video data the predetermined number of resampled data extracted by the data extracting means; and data outputting means for outputting the multiplexed data generated by the data multiplexing means.

According to a fifth aspect of the invention, there is provided a video camera comprising: data inputting means for inputting multiplexed data acquired by multiplexing control data into horizontal blanking portions of video data; data separating means for separating the video data and the control data from the multiplexed data; data defining means for defining definite data from the control data separated by the data separating means; first data outputting means for outputting the definite data defined by the data defining means; and second data outputting means for outputting the video data separated by the data separating means.

According to a sixth aspect of the invention, there is provided a video camera comprising: signal processing means for outputting video data; first data inputting means for inputting serial data transmitted at a first rate; data sampling means for generating resampled data by sampling the serial data input via the first data inputting means, the sampling being performed by use of a clock signal at a second rate higher than the first rate; data extracting means for extracting a predetermined number of resampled data from the resampled data output by the data sampling means in each of the horizontal periods of the video data; data multiplexing means for generating multiplexed data by multiplexing into horizontal blanking portions of the video data the predetermined number of resampled data extracted by the data extracting means; first data outputting means for outputting the multiplexed data generated by the data multiplexing means; second data inputting means for inputting multiplexed data acquired by multiplexing control data into horizontal blanking portions of the video data; data separating means for separating the video data and the control data from the multiplexed data input via the second data inputting means; data defining means for defining definite data from the control data separated by the data separating means; second data outputting means for outputting the definite data defined by the data defining means; and third data outputting means for outputting the video data separated by the data separating means.

According to a seventh aspect of the invention, there is provided a camera control unit comprising: first data inputting means for inputting serial data transmitted at a first rate; second data inputting means for inputting video data; data sampling means for generating resampled data by sampling the serial data input via the first data inputting means, the sampling being performed by use of a clock signal at a second rate higher than the first rate; data extracting means for extracting a predetermined number of resampled data from the resampled data output by the data sampling means in each of the horizontal periods of the video data; data multiplexing means for generating multiplexed data by multiplexing into horizontal blanking portions of the video data the predetermined number of resampled data extracted by the data extracting means; and data outputting means for outputting the multiplexed data generated by the data multiplexing means.

According to an eighth aspect of the invention, there is provided a camera control unit comprising: data inputting means for inputting multiplexed data acquired by multiplexing control data into horizontal blanking portions of video data; data separating means for separating the video data and the control data from the multiplexed data; data defining means for defining definite data from the control data separated by the data separating means; first data outputting means for outputting the definite data defined by the data defining means; and second data outputting means for outputting the video data separated by the data separating means.

According to a ninth aspect of the invention, there is provided a camera control unit comprising: first data inputting means for inputting serial data transmitted at a first rate; second data inputting means for inputting video data; data sampling means for generating resampled data by sampling the serial data input via the first data inputting means, the sampling being performed by use of a clock signal at a second rate higher than the first rate; data extracting means for extracting a predetermined number of resampled data from the resampled data output by the data sampling means in each of the horizontal periods of the video data; data multiplexing means for generating multiplexed data by multiplexing into horizontal blanking portions of the video data the predetermined number of resampled data extracted by the data extracting means; first data outputting means for outputting the multiplexed data generated by the data multiplexing means; third data inputting means for inputting multiplexed data acquired by multiplexing control data into horizontal blanking portions of the video data; data separating means for separating the video data and the control data from the multiplexed data input via the third data inputting means; data defining means for defining definite data from the control data separated by the data separating means; second data outputting means for outputting the definite data defined by the data defining means; and third data outputting means for outputting the video data separated by the data separating means.

According to a tenth aspect of the invention, there is provided a video camera system comprising a video camera, data transmitting means and a camera control unit. The video camera includes: signal processing means for outputting video data; first data inputting means for inputting serial data transmitted at a first rate; data sampling means for generating resampled data by sampling the serial data input via the first data inputting means, the sampling being performed by use of a clock signal at a second rate higher than the first rate; data extracting means for extracting a predetermined number of resampled data from the resampled data output by the data sampling means in each of the horizontal periods of the video data; data multiplexing means for generating multiplexed data by multiplexing as control data the predetermined number of resampled data extracted by the data extracting means into horizontal blanking portions of the video data; and first data outputting means for outputting the multiplexed data generated by the data multiplexing means. The data transmitting means transmits the multiplexed data output by the first data outputting means of the video camera. The camera control unit includes: second data inputting means for inputting the multiplexed data transmitted by the data transmitting means; data separating means for separating the video data and the control data from the multiplexed data input via the second data inputting means; data defining means for defining definite data from the control data separated by the data separating means; second data outputting means for outputting the definite data defined by the data defining means; and third data outputting means for outputting the video data separated by the data separating means.

According to an eleventh aspect of the invention, there is provided a video camera system comprising a camera control unit, data transmitting means and a video camera. The camera control unit includes: first data inputting means for inputting serial data transmitted at a first rate; second data inputting means for inputting video data; data sampling means for generating resampled data by sampling the serial data input via the first data inputting means, the sampling being performed by use of a clock signal at a second rate higher than the first rate; data extracting means for extracting a predetermined number of resampled data from the resampled data output by the data sampling means in each of the horizontal periods of the video data; data multiplexing means for generating multiplexed data by multiplexing as control data the predetermined number of resampled data extracted by the data extracting means into horizontal blanking portions of the video data; and first data outputting means for outputting the multiplexed data generated by the data multiplexing means. The data transmitting means transmits the multiplexed data output by the first data outputting means of the camera control unit. The video camera includes: third data inputting means for inputting the multiplexed data transmitted by the data transmitting means;

data separating means for separating the video data and the control data from the multiplexed data input via the third data inputting means; data defining means for defining definite data from the control data separated by the data separating means; second data outputting means for outputting the definite data defined by the data defining means; and third data outputting means for outputting the video data separated by the data separating means.

According to a twelfth aspect of the invention, there is provided a data transmission method comprising the steps of: inputting serial data transmitted at a first rate; inputting video data; generating resampled data by sampling the input serial data by use of a clock signal at a second rate higher than the first rate; extracting a predetermined number of resampled data from the resampled data generated in each of the horizontal periods of the video data; generating multiplexed data by multiplexing the extracted predetermined number of resampled data into horizontal blanking portions of the video data; and outputting the multiplexed data.

According to a thirteenth aspect of the invention, there is provided a data reception method comprising the steps of: inputting multiplexed data acquired by multiplexing control data into horizontal blanking portions of video data; separating the video data and the control data from the multiplexed data; defining definite data from the control data separated from the multiplexed data; outputting the definite data defined by the defining step; and outputting the video data separated from the multiplexed data.

According to a fourteenth aspect of the invention, there is provided a data transmission method comprising the steps of: inputting serial data transmitted at a first rate; inputting video data; generating resampled data by sampling the input serial data by use of a clock signal at a second rate higher than the first rate; extracting a predetermined number of resampled data from the resampled data generated in each of the horizontal periods of the video data; generating multiplexed data by multiplexing as control data the extracted predetermined number of resampled data into horizontal blanking portions of the video data; outputting the multiplexed data; transmitting the multiplexed data; separating the video data and the control data from the multiplexed data transmitted by the transmitting step; defining definite data from the control data separated from the multiplexed data; outputting the definite data defined by the data defining step; and outputting the video data separated from the multiplexed data.

Serial data is sampled by use of a clock signal having a clock rate higher than the transmission rate of the serial signal. The sampling process provides a plurality of resampled data in each one-bit period of the serial data. Even if the transmission rate of the serial data is lower than the horizontal blanking rate of video data, at least one item of resampled data is made available in each of the horizontal periods of the video data. In this state, a predetermined number of resampled data are selected from the resampled data obtained in each of the horizontal periods of the video data. The selected predetermined number of resampled data are multiplexed into the horizontal blanking portions of the video data when transmitted. Because the inventive method does not involve subjecting the serial data to serial-parallel conversion and multiplexing the converted data into the horizontal blanking portions of the video data, there is a minimum of data delay. With a predetermined number of data constantly multiplexed into each horizontal blanking portion of the video data, the inventive method eliminates the need for complicated control procedures for determining which horizontal blanking portion is to have data multiplexed therein and which portion is not to.

BRIEF DESCRIPTION OF THE DRAWINGS

FIGS. 8A through 8E are timing charts of typical data occurring in key components of the encoder;

FIGS. 12A through 12I are timing charts of typical data occurring in key components of the decoder; and FIGS. 13A through 13H are timing charts of other typical data occurring in key components of the decoder.

BEST MODE FOR CARRYING OUT THE INVENTION

Figure 1:
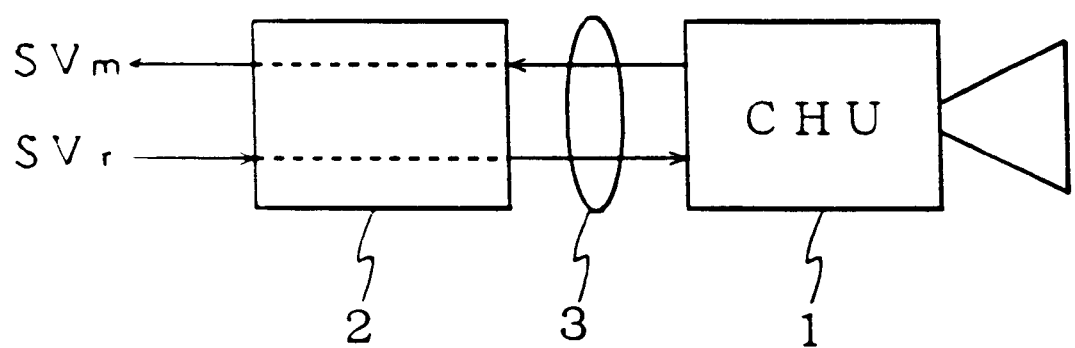
FIG. 1 is a block diagram of a video camera system practiced as a preferred embodiment of the invention.

FIG. 1 is a block diagram of a video camera system embodying the invention. The video camera system comprises a camera head unit (CHU) 1 and a camera control unit (CCU) 2 which is furnished on the side of a video processing block. The camera head unit 1 converts an object image taken by an imaging device into a video signal (electrical signal). The video signal is subjected to an appropriate process (video signal processing) before being transmitted to the camera control unit 2. One camera control unit 2, assigned to each camera head unit 1, adjusts to a predetermined level the picture quality of the video signal output by the camera head unit 1 in question. The camera control unit 2 and the camera head unit 1 are connected by a transmission cable 3 composed of optical fibers and triacs. The camera control unit 2 is also connected to various control devices and exchanges control signals, intercom signals and video signals with the camera head unit 1.

Main track video data SVm is sent from the camera head unit 1 to the video processing block via the camera control unit 2. The video processing block processes the main track video data SVm into a type of video data (e.g., broadcast-ready video data) which is fed as return video data SVr to the camera head unit 1 via the camera control unit 2.

As described, the main track video data SVm and return video data SVr are transmitted between the camera head unit 1 and the camera control unit 2. In this embodiment, serial command data is multiplexed into horizontal blanking portions of the video data SVm and SVr to be transmitted.

Figure 2:
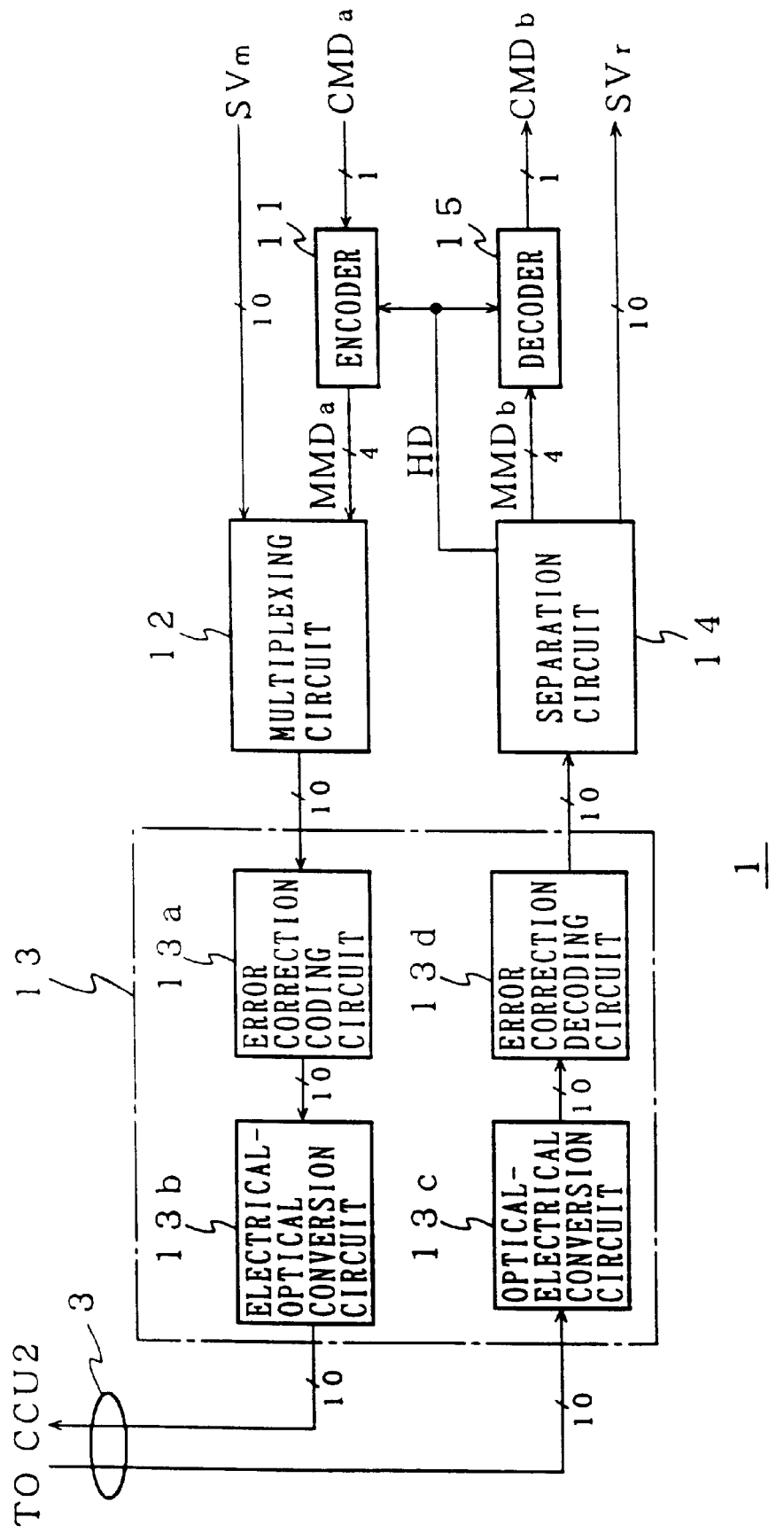
FIG. 2 is a block diagram of a serial communication command transmission block in a camera head unit.
Figure 3:
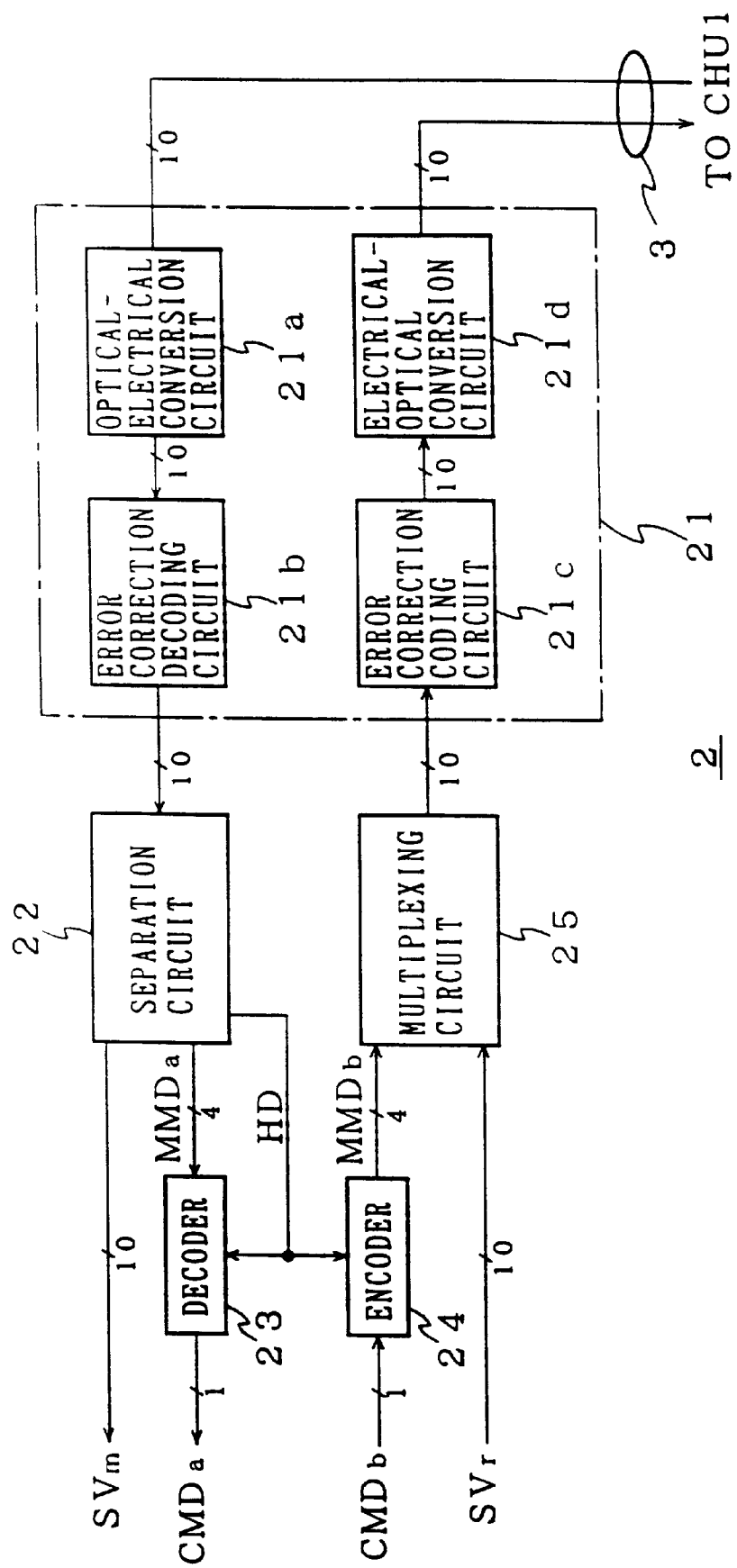
FIG. 3 is a block diagram of a serial communication command transmission block in a camera control unit.

FIG. 2 is a block diagram of a serial communication command transmission block in the camera head unit 1, and FIG. 3 is a block diagram of a serial communication command transmission block in the camera control unit 2. In this setup, the transmission cable 3 is an optical fiber cable.

Serial command data CMDa sent from a personal computer or the like reaches an encoder 11 in the camera head unit 1. The encoder 11 converts the supplied data into multiplexing data MMDa which is fed to a multiplexing circuit 12. The multiplexing circuit 12 multiplexes on a time basis the multiplexing data MMDa into the horizontal blanking portions of the main track video data SVm.

The main track video data SVm multiplexed with the multiplexing data MMDa is output by the multiplexing circuit 12 and supplied to a transmission circuit 13. The transmission circuit 13 comprises an error correction coding circuit 13a, an electrical-optical conversion circuit 13b, an optical-electrical conversion circuit 13c and an error correction decoding circuit 13d. The main track video data SVm multiplexed with the multiplexing data MMDa is subject to an error correction coding process by the error correction coding circuit 13a. Having undergone the error correction coding process, the main track video data SVm is converted by the electrical-optical conversion circuit 13b from electrical to optical format to become transmission data.

The transmission data output by the transmission circuit 13 is sent over the transmission cable (optical fiber cable) 3 to a transmission circuit 21 in the camera control unit 2. The transmission circuit 21 comprises an optical-electrical conversion circuit 21a, an error correction decoding circuit 21b, an error correct-ion coding circuit 21c and an electrical-optical conversion circuit 21d. In the transmission circuit 21, the optical-electrical conversion circuit 21a converts the transmitted data from optical to electrical format. The converted data is subject to an error correction process by the error correction decoding circuit 21b. Following the error correction process, the main track video data SVm multiplexed with the multiplexing data MMDa is output from the transmission circuit 21.

Figure 4:
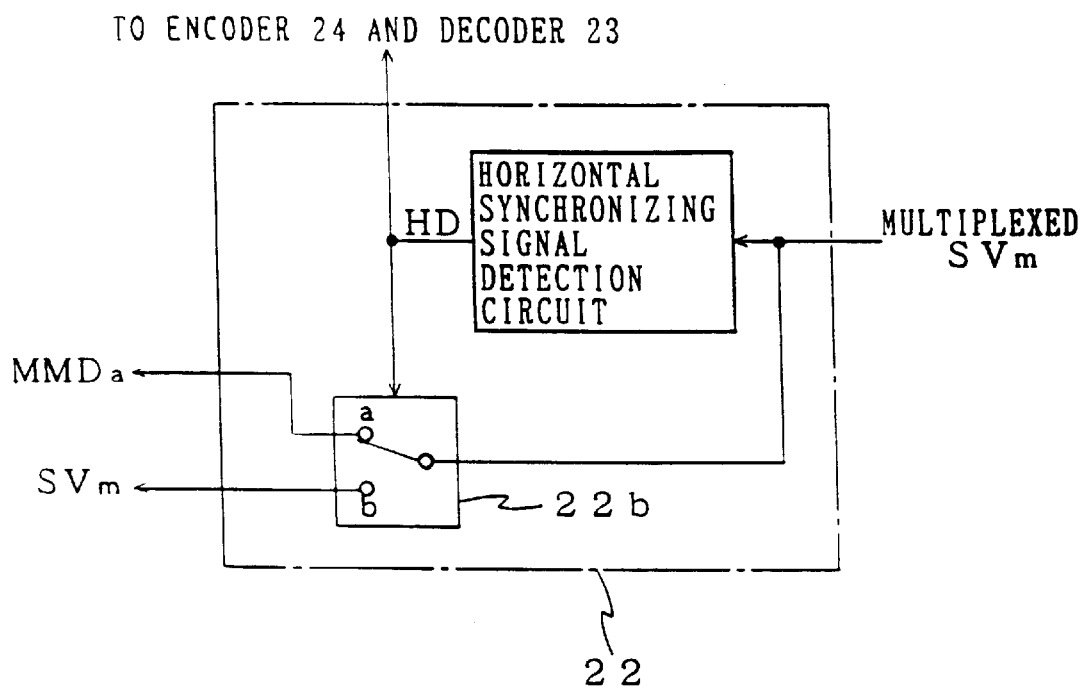
FIG. 4 is a block diagram of a separation circuit in the serial communication command transmission block of the camera control unit.

After leaving the transmission circuit 21, the main track video data SVm multiplexed with the multiplexing data MMDa reaches a separation circuit 22. As shown in FIG. 4, the separation circuit 22 comprises a horizontal synchronizing signal detection circuit 22a and a switching circuit 22b. The horizontal synchronizing signal detection circuit 22a extracts a horizontal synchronizing signal from the main track video data SVm, and the switching circuit 22b is switched by the horizontal synchronizing signal HD output by the horizontal synchronizing signal detection circuit 22a.

In the separation circuit 22, the supplied main track video data SVm enters the horizontal synchronizing signal detection circuit 22a which extracts the horizontal synchronizing signal HD from the data. The horizontal synchronizing signal HD from the horizontal synchronizing signal detection circuit 22a is input not only to the switching circuit 22b but also to a decoder 23 and an encoder 24.

In each horizontal blanking period, the switching circuit 22b conducts to the a side to output the multiplexing data MMDa. In other than the horizontal blanking periods, the switching circuit 22b conducts to the b side to output the main track video data SVm. In this manner, the main track video data SVm is separated from the multiplexing data MMDa. Following the separating process by the separation circuit 22, the main track video data SVm is led to the outside via the camera control unit 2. The main track video data SVm thus sent externally is supplied illustratively to a video processing block (not shown) for processing into broadcast-ready video data. The multiplexing data MMDa separated by the separation circuit 22 is fed to the decoder 23 and decoded thereby back to the initial serial communication command data CMDa. The serial communication command data CMDa is supplied illustratively to the personal computer or the like.

The serial communication command data CMDb fed from the personal computer or the like to the camera control unit 2 is sent to the encoder 24 in the camera control unit 2 for conversion into multiplexing data MMDb. The multiplexing data MMDb thus prepared is forwarded to a multiplexing circuit 25. The multiplexing circuit 25 multiplexes on a time basis the multiplexing data MMDb into the horizontal blanking portions of the return video data SVr.

The return video data SVr multiplexed with the multiplexing data MMDb is output by the multiplexing circuit 25 and supplied to the transmission circuit 21. The return video data SVr multiplexed with the multiplexing data MMDb is subject to an error correction coding process by the error correction coding circuit 21c. Following the error correction coding process, the return video data SVr is converted by the electrical-optical conversion circuit 21d from electrical to optical format to become transmission data.

The transmission data output by the transmission circuit 21 is sent over the transmission cable 3 to the transmission circuit 13 in the camera head unit 1. In the transmission circuit 13, the optical-electrical conversion circuit 13c converts the transmitted data from optical to electrical format. The converted data is subject to an error correcting process by the error correction decoding circuit 13d. Following the error correcting process, the return video data SVr multiplexed with the multiplexing data MMDb is output from the transmission circuit 13.

Figure 5:
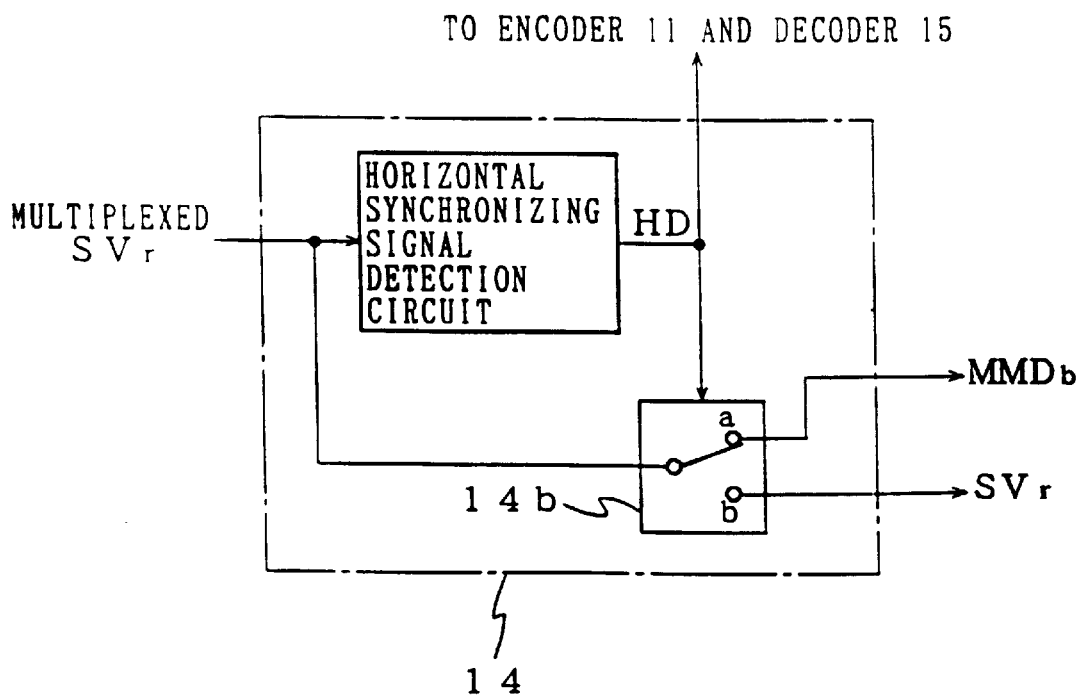
FIG. 5 is a block diagram of a separation circuit in the serial communication command transmission block of the camera head unit.

After leaving the transmission circuit 13, the return video data SVr multiplexed with the multiplexing data MMDb reaches a separation circuit 14. As depicted in FIG. 5, the separation circuit 14 comprises a horizontal synchronizing signal detection circuit 14a and a switching circuit 14b. The horizontal synchronizing signal detection circuit 14a extracts a horizontal synchronizing signal from the return video data SVr, and the switching circuit 14b is switched by the horizontal synchronizing signal HD output by the horizontal synchronizing signal detection circuit 14a.

In the separation circuit 14, the supplied return video data SVr enters the horizontal synchronizing signal detection circuit 14a which extracts the horizontal synchronizing signal HD from the data. The horizontal synchronizing signal HD from the horizontal synchronizing signal detection circuit 22a is input not only to the switching circuit 14b but also to the encoder 11 and a decoder 15.

In each horizontal blanking period, the switching circuit 14b conducts to the a side to output the multiplexing data MMDb. In other than the horizontal blanking periods, the switching circuit 14b conducts to the b side to output the return video data SVr. In this manner, the return video data SVr is separated from the multiplexing data MMDb. Following the separating process by the separation circuit 14, the return video data SVr is fed illustratively to a monitor television set (not shown) via the camera head unit 1. The multiplexing data MMDb separated by the separation circuit 14 is fed to the decoder 15 and decoded thereby back to the initial serial communication command data CMDb. The serial communication command data CMDb is fed illustratively to the personal computer or the like.

Figure 6:
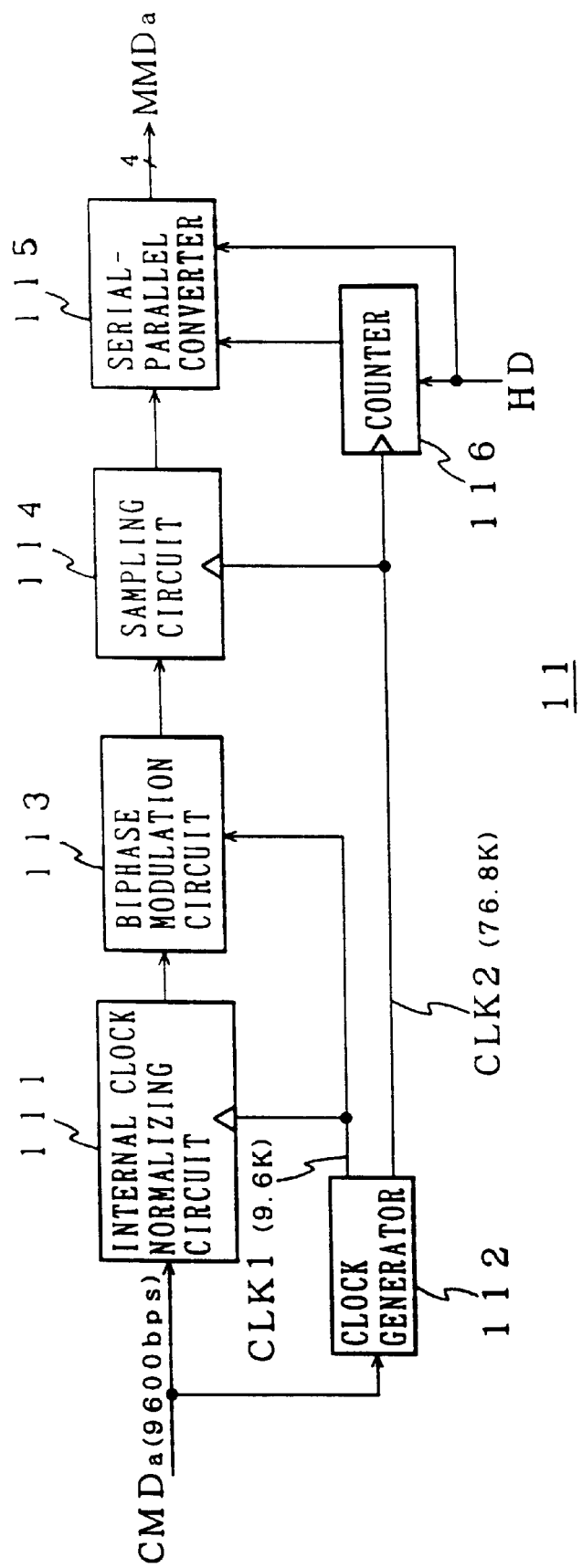
FIG. 6 is a block diagram of an encoder.

FIG. 6 is a block diagram of the encoder 11 in the camera head unit 1. This encoder applies to a setup where the serial communication command data CMDa is NRZ (non-return-to-zero) data whose transmission rate is 9,600 bps.

In FIG. 6, the command data CMDa is fed to an internal clock normalizing circuit 111 as well as to a clock generator 112. The clock generator 112 outputs a clock signal CLK1 at 9.6 kHz in synchronism with the command data CMDa and a clock signal CLK2 at 76.8 (i.e., 9.6×8) kHz.

The clock signal CLK1 output by the clock generator 112 is supplied to the normalizing circuit 111. The normalizing circuit 111 performs its normalizing operation by having the command data CMDa sampled through the use of the clock signal CLK1. The data output by the normalizing circuit 111 is modulated into binary data whose value is inverted at least upon each clock pulse so that the direct current (DC) component will be removed from the data. The modulating process is carried out by a biphase modulation circuit 113 that subjects the input data to biphase modulation. The biphase modulation circuit 113 converts NRZ data into biphase data. The biphase modulation circuit 113 is supplied with the clock signal CLK1 as its operating clock signal from the clock generator 112.

The biphase data from the biphase modulation circuit 113 is sent to a sampling circuit 114. In turn, the sampling circuit 114 samples the biphase data using the clock signal CLK2 from the clock generator 112. In this setup, the clock signal CLK2 is generated at 76.8 kHz, i.e., eight times the transmission rate of the command data CMDa. Thus the sampling circuit 114 acquires so-called resampled data by sampling, on average per horizontal period, about 4.8 data items (with the NTSC scheme) or about 4.9 data items (with the PAL scheme). That is, the sampling circuit 114 obtains four or five resampled data items through sampling in each horizontal period of the video data.

Figure 7:
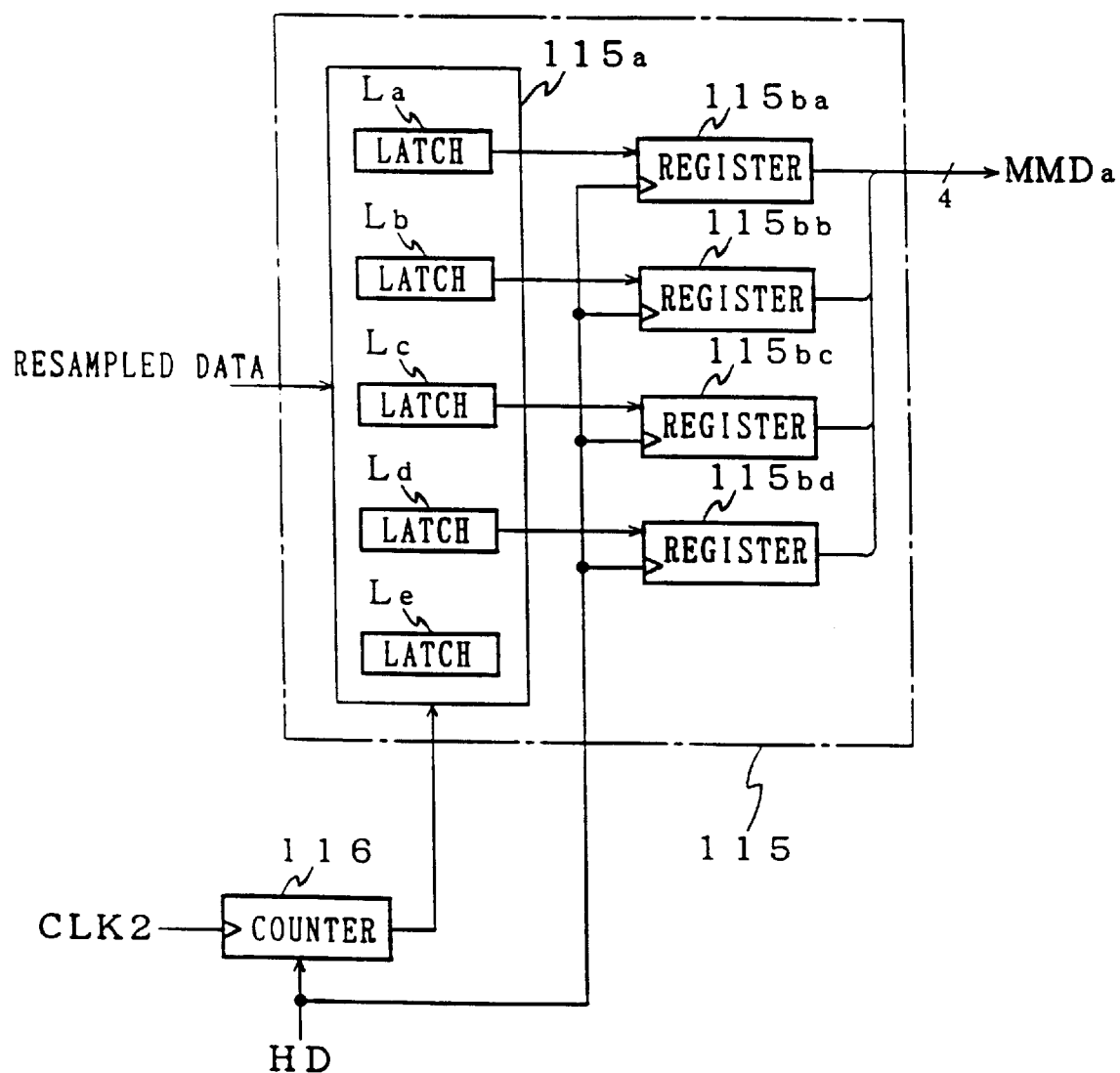
FIG. 7 is a block diagram of a serial-parallel converter in the encoder.

The resampled data from the sampling circuit 114 is fed to a serial-parallel converter 115. As shown in FIG. 7, the serial-parallel converter 115 comprises a selector 115a and registers 115ba through 115bd. The selector 115a latches the resampled data from the sampling circuit 114 by allocating the data to component latches La through Le. The registers 115ba through 115bd receive in synchronism with the horizontal synchronizing signal HD the resampled data latched by the latches La through Ld, whereby the multiplexing data MMDa is obtained. The horizontal synchronizing signal HD is fed to the registers 115ba through 115bd as the clock signal for their data reception.

The clock signal CLK2 from the clock generator 112 is supplied to a counter 116 as its count clock signal. The counter 116 is fed with the horizontal synchronizing signal HD as its reset signal. The count output of the counter 116 is sent to the selector 115a as address control data. As the counter 116 counts "0," "1," "2," "3," and "4," the selector 115a allocates the resampled data from the sampling circuit 114 to the latches La, Lb, Lc, Ld and Le respectively for latching operations thereby.

In each horizontal period, the first through fifth resampled data sampled by the sampling circuit 114 are latched respectively by the latches La through Le in the selector 115a. Only the four resampled data latched by the latches La through Ld are received by the registers 115ba through 115bd in synchronism with the horizontal synchronizing signal HD. The latched data constitute four-bit multiplexing data MMDa for use in the next horizontal period. In this case, the resampled data item latched by the latch Le is not used as part of the multiplexing data MMDa and is discarded.

The main track video data SVm is 10-bit data, whereas the multiplexing data MMDa is four-bit data. Thus where the four-bit multiplexing data MMDa is to be multiplexed into each horizontal blanking portion of the main track video data SVm, the data MMDa is multiplexed into a four-bit field of the 10-bit portion.

FIGS. 8A through 8E are timing charts of typical data occurring in key components of the encoder 11 of FIG. 6. If the command data CMDa output by the normalizing circuit 111 is one shown in FIG. 8C, then the biphase data from the biphase demodulation circuit 113 becomes as illustrated in FIG. 8D and the resampled data from the sampling circuit 114 becomes as depicted in FIG. 8E. In each horizontal period, the serial-parallel converter 115 outputs the multiplexing data MMDa grouped in units of four bits as shown in FIG. 8E. The data part indicated as "discarded" FIG. 8E is the data to be thinned out. FIGS. 8A and 8B show the timings of the clock signals CLK2 and CLK1 respectively.

Figure 9:
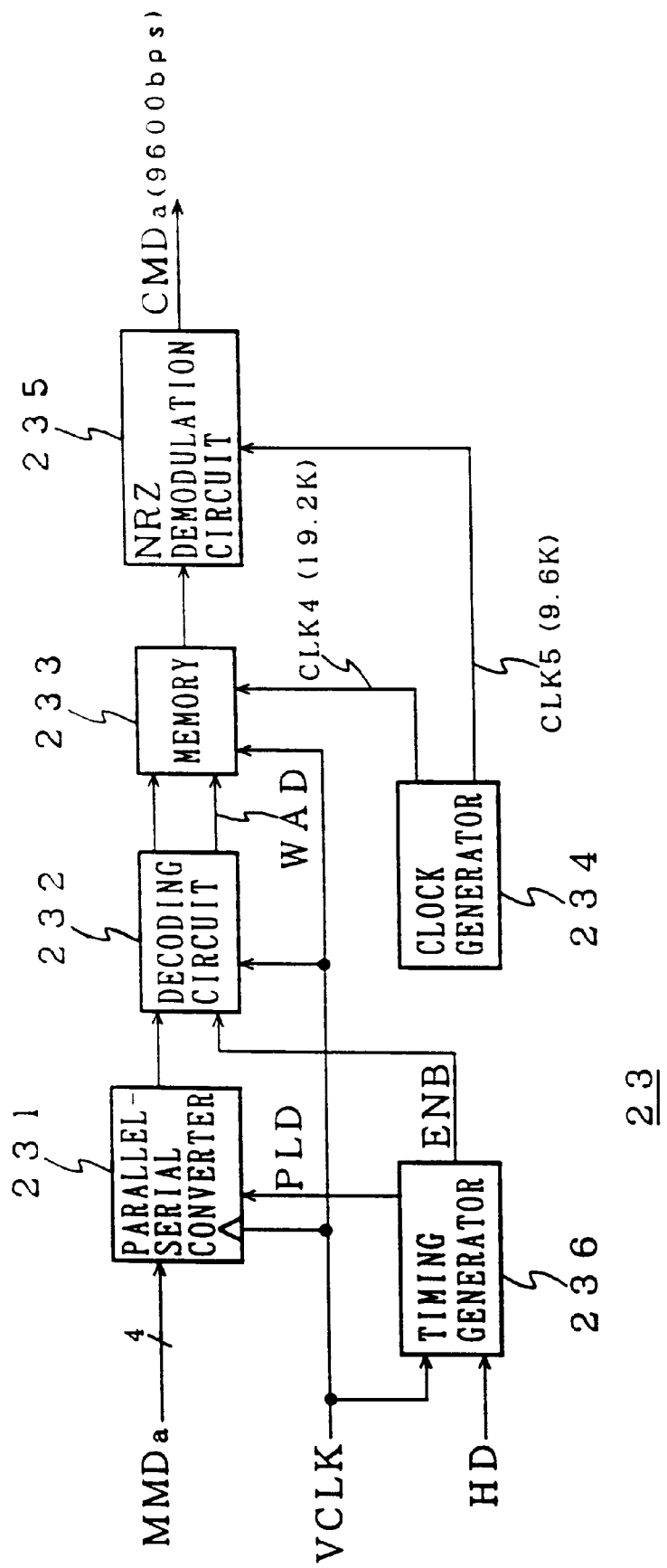
FIG. 9 is a block diagram of a decoder.

FIG. 9 is a block diagram of the decoder 23 in the camera control unit 2. This is also the case in which the serial communication command data CMDa has the transmission rate of 9,600 bps.

In FIG. 9, the four-bit multiplexing data MMDa is fed to a parallel-serial converter 231 and loaded into a shift register therein in accordance with a load pulse signal PLD. The load pulse signal PLD is output by a timing generator 236 in synchronism with the supply timing of the multiplexing data MMDa, the generator 236 receiving the horizontal synchronizing signal HD and a clock signal VCLK (e.g., 13.5 MHz) for the video signal. The shift register in the parallel-serial converter 231 receives its shift clock signal in the form of the clock signal VCLK for video signal use. These arrangements allow the parallel-serial converter 231 to convert successively the multiplexing data MMDa supplied in each horizontal period from parallel to serial data.

The serial data output by the parallel-serial converter 231 is sent to a decoding circuit 232 together with an effective data region signal ENB output by the timing generator 236. The effective data region signal ENB is illustratively brought Low corresponding to the four serial data items (i.e., effective data) output by the parallel-serial converter 231 converting the four-bit multiplexing data MMDa in each horizontal period. The decoding circuit 232 is given as its operating clock signal the clock signal VCLK for the video signal.

Of the serial data supplied continuously from the parallel-serial converter 231, only the effective data indicated by the effective data region signal ENB is subject to decoding by the decoding circuit 231. Because the sampling clock signal of the encoder 11 in FIG. 6 has a frequency eight times that of the command data CMDa, four resampled data items are acquired in each period of the biphase data. Since the encoder 11 carries out the above-mentioned thinning-out process to obtain the multiplexing data MMDa, one string of effective data comprises three, four, seven or eight data items of the same data value.

For the reason above, if any data string of effective data includes at least three consecutive data items of the same value (1 or 0), the decoding circuit 232 defines the data as definite data. The data defining process is carried out continuously. Any data string comprising less than three data items of the same value is regarded as invalid data. For example, if an effective data string is made up of "1111000000001111. . . ," the first three 1's are defined as definite data "1" and the next "1" is regarded as invalid data; the ensuing three 0's are defined as definite data "0" and the next two 0's are regarded as invalid data, and so on define The process above is formulated in general terms as follows: if the sampling clock rate is m times the transmission rate of the serial data to be sampled (biphase data in this example) and if there exist m−1 data items of the same value, then the process of defining the data as definite data is carried out continuously.

Figure 10:
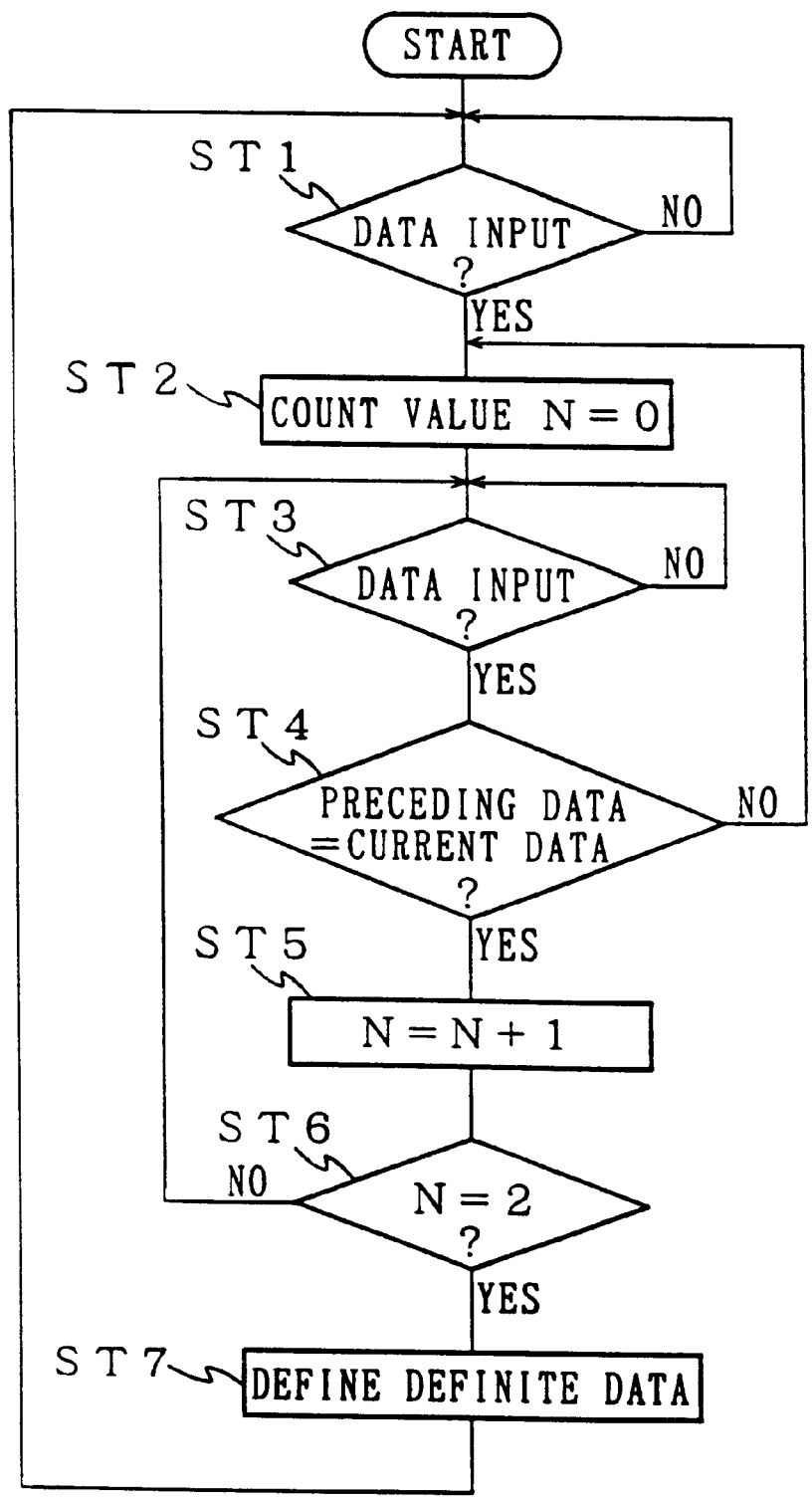
FIG. 10 is a flowchart of steps constituting a typical decoding process by the decoder.

FIG. 10 is a flowchart of steps constituting a typical decoding process (called the first process hereunder) performed by the decoding circuit 231. In step ST1, a check is made to see if data is input. If data is found to be input, step ST2 is reached in which the count value N is reset to 0. In step ST3, another check is made to see if data is input. If data is found to be input in step ST3, step ST4 is reached in which a check is made to see if the preceding data is the same as the current data. If the preceding and the current data are found to be different, step ST2 is reached again and the count value N is reset to 0.

If the preceding data is found to be the same as the current data in step ST4, the count value N is incremented by 1 in step ST5. In step ST6, a check is made to see if the count value N is 2. If the count value is other than 2, step ST3 is reached again in which another check is made to see if data is input.

If the count value N is found to be 2 in step ST6, that means three data items of the same value have continued. Thus the value of the data is defined as definite data in step ST7. Step ST7 is followed by step ST1 in which another check is made to see if data is input, and the process is repeated.

The decoding circuit 232 may carry out an alternative process (called the second process hereunder) different from the above-described first process. Specifically, when the decoding circuit 232 detects three consecutive data items of the same data value (1 or 0) in a data string composed of effective data, the consecutive data items are defined as definite data. If the data item immediately following the data items defined as the definite data has the same value, the single data item is regarded as invalid data. The process is performed continuously. For example, if an effective data string made up of "1111000000001111 . . . " is provided, the definite data "1" is obtained from the first three 1's and the next 1 is regarded as invalid data; the definite data "0" is acquired from the ensuing three 0's and the next 0 is considered invalid; the definite data "0" is gained from the following three 0's and the next 0 is regarded as invalid data, and so on.

Figure 11:
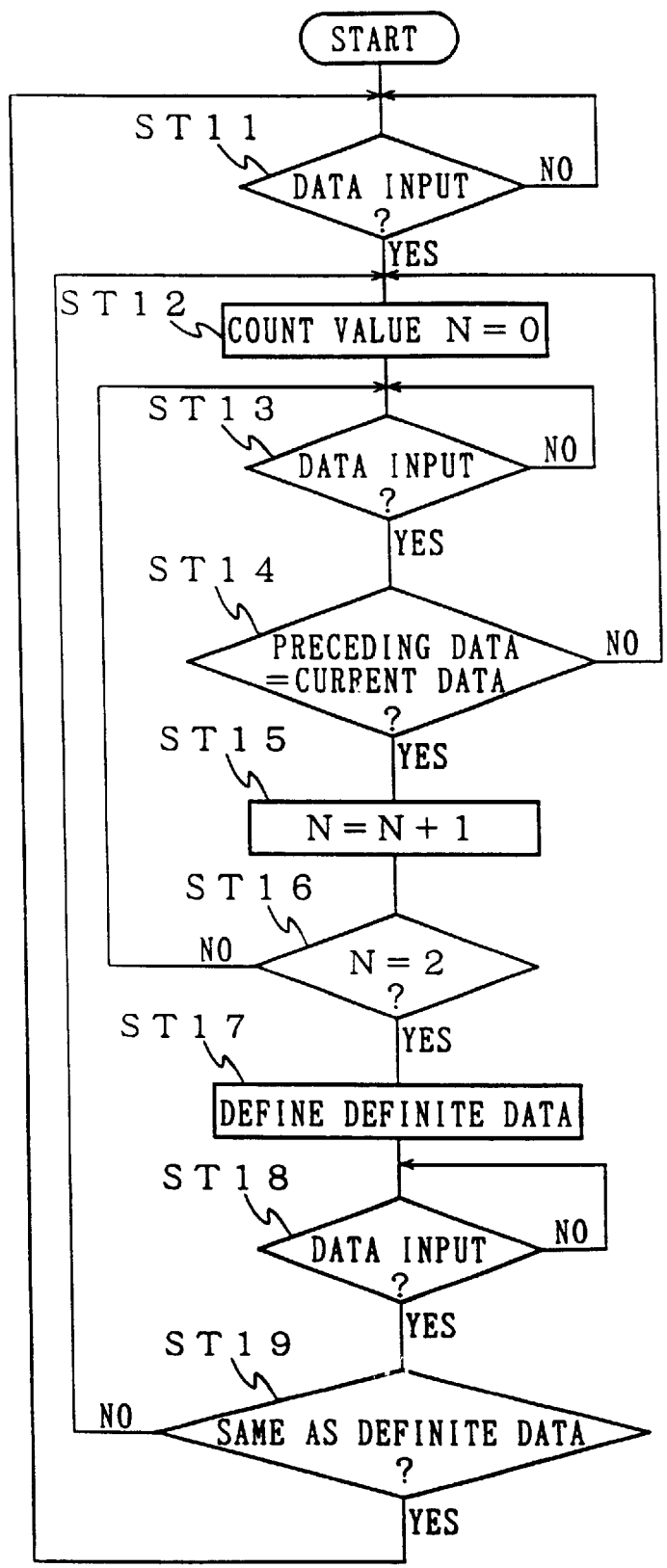
FIG. 11 is a flowchart of steps constituting another typical decoding process by the decoder.

FIG. 11 is a flowchart of steps constituting the above-mentioned alternative decoding process (i.e., second process) performed by the decoding circuit 231. In step ST11, a check is made to see if data is input. If data is found to be input in step ST11, step ST12 is reached, in which the count value N is reset to 0. In step ST13, a check is made to see if data is again input. If data is found to be input again in step ST13, step ST14 is reached in which a check is made to see if the preceding data is the same as the current data. If the preceding and the current data are found to be different, step ST12 is reached again and the count value N is reset to 0.

If the preceding data is found to be the same as the current data in step ST14, step ST15 is reached in which the count value N is incremented by 1. In step ST16, a check is made to see if the count value N is 2. If the count value N is found to be other than 2 in step ST16, step ST13 is reached again in which another check is made to see if data is input.

If the count value N is found to be 2 in step ST16, that means three data items of the same value have continued. Thus the value of the data is defined as definite data in step ST17. Step ST17 is followed by step ST18 in which a check is made to see if data is input. If data is found to be input in step ST18, step ST19 is reached in which a check is made to see if the data has the same value as the definite data. If the data is found to have a different value in step ST19, the data is regarded as effective data. In that case, step ST12 is reached again and the count value N is reset to 0. If the data is found to have the same value as the definite data in step ST19, the data is regarded as invalid data, and step ST1 is reached again in which another check is made to see if data is input, and the process is repeated.

The definite data output by the decoding circuit 232 is fed and written successively to an FIFO (first-in first-out) memory 233. In that case, the decoding circuit 232 supplies the memory 233 with a write address WAD to designate in the memory the write address to which to write the definite data from the decoding circuit 231. The definite data placed in the memory 233 is read out successively through the use of a clock signal at 19.2 kHz given by a clock generator 234.

The data read from the memory 233 is biphase data which is fed to an NRZ demodulation circuit 235. In turn, the circuit 235 demodulates the biphase data back to the initial NRZ data from which the serial communication command data CMDa is reconstructed. The clock generator 234 supplies the NRZ demodulation circuit 235 with a clock signal CLK5 at 9.6 kHz as the operating clock signal of the latter.

FIGS. 12A through 12I are timing charts of typical data occurring in key components of the decoder 23 of FIG. 9. If the multiplexing data MMDa fed to the parallel-serial converter 231 in each horizontal period is as shown in FIG. 12A, then the serial data output by the parallel-serial converter 231 and the effective data region signal ENB become as illustrated in FIG. 12B. The decoding circuit 232 processes each effective data string as depicted in FIG. 12C (first process) or in FIG. 12D (second process) to obtain definite data. In FIGS. 12C and 12D, reference character "XX" denotes data considered invalid. In so acting, the decoding circuit 232 acquires definite data as indicated in FIG. 12E. The definite data thus obtained is written consecutively to the memory 233. From the memory 233, biphase data is acquired as shown in FIG. 12G. The NRZ demodulation circuit 235 yields the serial communication command data CMDa (9,600 bps) reconstructed as shown in FIG. 12I. FIGS. 12F and 12H indicate the clock signals CLK4 and CLK5 respectively.

Whereas FIG. 6 shows a typical constitution of the encoder 11 in the camera head unit 1, the encoder 24 in the camera control unit 2 has the same constitution. In like manner, whereas FIG. 9 depicts a typical structure of the decoder 23 in the camera control unit 2, the decoder 15 in the camera head unit 1 also has the same structure.

The examples of FIGS. 6 and 9 apply where the serial communication command data CMDa is NRZ data whose transmission rate is 9,600 bps. However, this is not limitative of the invention; the same encoder and decoder constitutions permit encoding and decoding where the serial data is not NRZ data and the transmission rate of the data is other than 9,600 bps.

The attached table 1 lists typical transmission rates of serial data, sampling clock examples corresponding to those representative transmission rates in connection with the sampling circuit 114 of the encoder, and typical numbers of bits to be multiplexed into the horizontal blanking portions corresponding to the transmission rates.

In such cases, the sampling circuit 114 outputs, on average per horizontal period, approximately 8.9 data items at a sampling clock frequency of 140.625 kHz, 17.9 data items at 281.25 kHz, 35.8 at 562.5 kHz, 71.5 at 1,125 kHz, and 143 at 2,250 kHz with the NTSC scheme. With the PAL scheme, the sampling circuit 114 outputs 9, 18, 36, 72 and 144 data items at 140.625, 281, 25, 562,5, 1,125 and 2,250 kHz respectively. Thus for each of the transmission rates, the encoder in question carries out the same thinning-out process of data as that of FIG. 3 to obtain eight-bit, 16-bit, 32-bit, 64-bit or 128-bit multiplexing data.

What is important in the data thinning-out process is that it is performed so as not to impair the information constituted by the data modulated into binary data whose value is inverted at least upon each clock pulse (i.e., information represented by the biphase data in this case). For example, if a sampling clock signal is given at a frequency four times the transmission rate of data, two resampled data items are obtained in each period of the biphase data. Thus it is inhibited to thin out two consecutive data items.

Illustratively, if the sample clock frequency is 562.5 kHz and if the number of bits to be multiplexed into the horizontal blanking portions of NTSC video data is 32, then the data output consecutively by the sampling circuit 114 in each horizontal period are subject to the following process of data selection: the first through the eighth data item are regarded as effective data, the ninth data item is regarded as invalid data, the 10th through 17th as effective, the 18th as invalid, the 19th through 26th as effective, the 27th as invalid, and the 28th through 35th as effective. In this manner, the effective data selection process provides 32-bit multiplexing data in each horizontal period.

The decoder for decoding serial communication command data from multiplexing data operates in the same manner as the decoder of FIG. 9. That is, an effective data string is first acquired by consecutively subjecting the multiplexing data MMDa of each horizontal period to parallel-serial conversion. From the effective data string, definite data corresponding to biphase data is obtained. The definite data is later converted to NRZ data whereby the command data CMDa is restored.

Illustratively, if the sampling clock frequency of the encoder is four times the transmission rate of the command data CMDa, two resampled data items are acquired in each period of the biphase data as described above. Since the encoder carries out the above-mentioned thinning-out process, each effective data string is composed of one to four data items of the same value. Thus given a data string made up of continuously effective data, the decoding circuit 232 of the decoder defines one data item (1 or 0) as definite data and regards the next data item as invalid data if the latter has the same value as the definite data. This process is carried out continuously.

For example, if the effective data string is constituted as "1100001110011 . . . ", the definite data "1" is obtained from the first 1 and the next 1 is regarded as invalid data; the definite data "0" is acquired from the ensuing 0 and the next 0 is considered invalid; the definite data "0" is gained from the next 0 and the following 0 is regarded as invalid data; the definite data "1" is again obtained from the ensuing 1 and the next 1 is considered invalid; the definite data "1" is acquired from the next 1 and the following 0 is regarded as definite data "0," and so on.

FIGS. 13A through 13H are timing charts of typical data occurring in key components of the decoder of FIG. 9 wherein the sampling clock frequency is four times the transmission rate of the serial communication command data CMDa, with the multiplexing data MMDa being of eight bits. Specifically, if the parallel-serial converter 231 is supplied in each horizontal period with the multiplexing data MMDa as shown in FIG. 13A, the serial data output by the parallel-serial converter 231 and the effective data region signal ENB become as illustrated in FIG. 13B. The decoding circuit 232 processes each effective data string as depicted in FIG. 13C to obtain definite data. In FIG. 13C, reference character "X" denotes data considered invalid.

The decoding circuit 232 provides definite data as shown in FIG. 13D. The definite data thus acquired is written successively to the memory 233. From the memory 233, biphase data shown in FIG. 13F is obtained. The NRZ demodulation circuit 235 yields the serial communication command data CMDa reconstructed as shown in FIG. 13H. FIGS. 13E and 13G depict the clock signals CLK4 and CLK5 respectively. The clock signal CLK4 has a frequency twice the transmission rate of the command data CMDa, and the clock signal CLK5 has the same frequency as the transmission rate of the command data CMDa.

With the embodiment of the invention, as described above, the serial communication command data CMDa and CMDb are sampled at a clock frequency higher than their transmission rates in each horizontal period. The resampled data thus obtained are subject to the selection process whereby a predetermined number of data items, the first through the fourth data item if the transmission rate is illustratively 9,600 bps, are selected. This generates the data MMDa and MMDb to be multiplexed into the horizontal blanking portions of the video data SVm and SVr. That is, the serial communication data CMDa and CMDb are not subject to serial-parallel conversion to be multiplexed into the horizontal blanking portions of the video data. This minimizes any delay of the serial communication command data CMDa and CMDb which are multiplexed with the video data SVm and SVr when transmitted between the camera head unit 1 and the camera control unit 2.

According to the invention, a fixed number of bits, e.g., four bits if the transmission rate is 9,600 bps, are always multiplexed into each horizontal blanking portion of the video data SVm and SVr. This eliminates the need for the camera head unit 1 and camera control unit 2 to institute complicated control procedures for determining which horizontal blanking portion is to have the data multiplexed therein and which portion is not to.

Although the invention has been shown applying to the case where serial communication command data are multiplexed into the horizontal blanking portions of video data when transmitted between the camera head unit 1 and the camera control unit 2, this is not limitative of the invention. The invention also applies to cases where other serial data are multiplexed into the horizontal blanking portions of video data when transmitted.

With the above embodiment of the invention, serial communication command data are multiplexed into the horizontal blanking portions of video data when transmitted. Alternatively, other control data, e.g., prompt data, intercom signals and those data other than video data which need to be transmitted between the camera control unit 2 and the camera head unit 1 may be multiplexed into the horizontal blanking portions of the video data.

EXPLOITATION IN INDUSTRY

As described, the data transmission apparatus and camera system according to the invention may be adapted advantageously to a camera system wherein serial communication data are multiplexed into the horizontal blanking portions of video data when transmitted between a camera head unit and a camera control unit.

TABLE 1

| TRANSMISSION RATE | SAMPLING CLOCK | THE NUMBER OF MULTIPLEXED BIT OF HORIZONTAL BLANKING PORTION | |
|---|---|---|---|
| | | NTSC | PAL |
| 2400 bps | 76800 Hz | 4 | 4 |
| 4800 bps | 76800 Hz | 4 | 4 |
| 9600 bps | 76800 Hz | 4 | 4 |
| 19200 bps | 76800 Hz | 4 | 4 |
| 35.15625 kbps | 140.625 KHz | 8 | 8 |
| 70.3125 kbps | 281.25 KHz | 16 | 16 |
| 140.625 kbps | 562.5 KHz | 32 | 32 |
| 281.25 kbps | 1125 KHz | 64 | 64 |
| 562.5 kbps | 2250 KHz | 128 | 128 |

What is claimed is:

1. A data reception apparatus comprising:
   data inputting means for inputting multiplexed data acquired by multiplexing control data into blanking portions of video data;
   data separating means for separating said video data and said control data from said multiplexed data wherein said data separating means separates parallel control data from said multiplexed data, said data separating means further including parallel-serial converting means for obtaining a data string by subjecting said parallel control data to parallel-serial conversion in accordance with a load pulse signal;
   data defining means for defining definite data from said control data separated by said data separating means;
   first data outputting means for outputting said definite data defined by said data defining means; and
   second data outputting means for outputting said video data separated by said data separating means.

2. A data reception apparatus according to claim 1, wherein said data defining means defines said definite data from said data string output by said parallel-serial converting means and wherein only effective data as indicated by an effective data region signal is subject to defining.

3. A data reception apparatus according to claim 1, wherein said data defining means includes data storing means for having said definite data stored therein, said definite data being read and output at a predetermined clock rate from said data storing means.

4. A data reception apparatus according to claim 1, wherein said first data outputting means includes data demodulating means for demodulating said definite data.

5. A data reception apparatus according to claim 4, wherein said data demodulating means demodulates said definite data into NRZ data.

6. A video camera comprising:
   data inputting means for inputting multiplexed data acquired by multiplexing control data into blanking portions of video data;
   data separating means for separating said video data and said control data from said multiplexed data wherein said data separating means separates parallel control data from said multiplexed data, said data separating means further including parallel-serial converting means for obtaining a data string by subjecting said parallel control data to parallel-serial conversion in accordance with a load pulse signal;
   data defining means for defining definite data from said control data separated by said data separating means;
   first data outputting means for outputting said definite data defined by said data defining means; and
   second data outputting means for outputting said video data separated by said data separating means.

7. A video camera according to claim 6, wherein said data defining means defines said definite data from said data string output by said parallel-serial converting means and wherein only effective data as indicated by an effective data region signal is subject to defining.

8. A video camera according to claim 6, wherein said data defining means includes data storing means for having said definite data stored therein, said definite data being read and output at a predetermined clock rate from said data storing means.

9. A video camera according to claim 6, wherein said first data outputting means includes data demodulating means for demodulating said definite data.

10. A video camera according to claim 9, wherein said data demodulating means demodulates said definite data into NRZ data.

11. A camera control unit comprising:
    data inputting means for inputting multiplexed data acquired by multiplexing control data into blanking portions of video data;
    data separating means for separating said video data and said control data from said multiplexed data wherein said data separating means separates parallel control data from said multiplexed data, said data separating means further including parallel-serial converting means for obtaining a data string by subjecting said parallel control data to parallel-serial conversion in accordance with a load pulse signal;
    data defining means for defining data from said control data separated by said data separating means;
    first data outputting means for outputting said definite data defined by said data defining means; and
    second data outputting means for outputting said video data separated by said data separating means.

12. A camera control unit according to claim 11, wherein said data defining means defines said definite data from said data string output by said parallel-serial converting means and wherein only effective data as indicated by an effective data region signal is subject to defining.

13. A camera control unit according to claim 11, wherein said data defining means includes data storing means for having said definite data stored therein, said definite data being read and output at a predetermined clock rate from said data storing means.

14. A camera control unit according to claim 11, wherein said first data outputting means includes data demodulating means for demodulating said definite data.

15. A video camera according to claim 14, wherein said data demodulating means demodulates said definite data into NRZ data.

16. A data reception method comprising the steps of:
    inputting multiplexed data acquired by multiplexing control data into blanking portions of video data;
    separating said video data and said control data from said multiplexed data by separating parallel control data from said multiplexed data, and obtaining a data string by subjecting said parallel control data to parallel-serial conversion in accordance with a load pulse signal;
    defining definite data from said control data separated from said multiplexed data; outputting said definite data defined by said defining step; and outputting said video data separated from said multiplexed data.

17. A data reception method according to claim 16, wherein said data defining step defines said definite data from said data string and wherein only effective data as indicated by an effective data region signal is subject to defining.

18. A data reception method according to claim 16, wherein said data defining step includes the step of having said definite data stored into storing means, and the step of reading and outputting said definite data from said storing means at a predetermined clock rate.

19. A data reception method according to claim 16, wherein said step of outputting said definite data demodulates said definite data prior to the output of said definite data.

20. A data reception method according to claim 19, wherein said definite data is demodulated into NRZ data.

* * * * *